(12) United States Patent
Hartung

(10) Patent No.: US 10,287,910 B2
(45) Date of Patent: May 14, 2019

(54) ADJUSTABLE GUIDE VANE FOR A TURBOMACHINE

(71) Applicant: MTU Aero Engines AG, Munich (DE)

(72) Inventor: Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 597 days.

(21) Appl. No.: 14/992,279

(22) Filed: Jan. 11, 2016

(65) Prior Publication Data

US 2016/0215651 A1 Jul. 28, 2016

(30) Foreign Application Priority Data

Jan. 28, 2015 (EP) ..................................... 15152776

(51) Int. Cl.
| | |
|---|---|
| *F01D 25/04* | (2006.01) |
| *F01D 9/04* | (2006.01) |
| *F01D 17/14* | (2006.01) |
| *F04D 29/56* | (2006.01) |
| *F04D 29/66* | (2006.01) |
| *F01D 5/16* | (2006.01) |
| *F01D 5/26* | (2006.01) |
| *F01D 17/16* | (2006.01) |

(Continued)

(52) U.S. Cl.
CPC ............... *F01D 25/04* (2013.01); *F01D 5/16* (2013.01); *F01D 5/26* (2013.01); *F01D 9/041* (2013.01); *F01D 17/14* (2013.01); *F01D 17/162* (2013.01); *F04D 27/0246* (2013.01); *F04D 29/563* (2013.01); *F04D 29/668* (2013.01); *F05D 2220/323* (2013.01); *F05D 2230/11* (2013.01); *F05D 2230/12* (2013.01); *F05D 2230/238* (2013.01); *F05D 2240/12* (2013.01); *F05D 2240/50* (2013.01); *F05D 2260/96* (2013.01); *F16F 7/10* (2013.01); *F16F 15/14* (2013.01); *Y02T 50/671* (2013.01)

(58) Field of Classification Search
CPC .......... F01D 25/04; F01D 5/16; F01D 17/162; F01D 5/26; F01D 17/14; F01D 9/041; F04D 27/0246; F04D 29/563; F04D 29/668; Y02T 50/671; F16F 15/14; F16F 7/10; F05D 2240/12; F05D 2240/50; F05D 2260/96; F05D 2230/238; F05D 2230/11; F05D 2230/12; F05D 2230/222023
See application file for complete search history.

(56) References Cited

U.S. PATENT DOCUMENTS

| | | | | |
|---|---|---|---|---|
| 2,349,187 A | * | 5/1944 | Meyer | ....................... F01D 5/16 188/322.5 |
| 2,771,240 A | * | 11/1956 | Gurin | ...................... F01D 5/027 301/5.22 |

(Continued)

FOREIGN PATENT DOCUMENTS

| | | |
|---|---|---|
| EP | 0467427 A2 | 1/1992 |
| EP | 2806105 A1 | 11/2014 |

(Continued)

*Primary Examiner* — Carlos A Rivera
*Assistant Examiner* — Adam W Brown
(74) *Attorney, Agent, or Firm* — Barlow, Josephs & Holmes, Ltd.

(57) ABSTRACT

The present invention relates to an adjustable guide vane for a turbomachine, having a vane element and a turning disk, which has a first impact chamber, in which an impulse element is arranged with play of movement.

15 Claims, 1 Drawing Sheet

Figure 1:
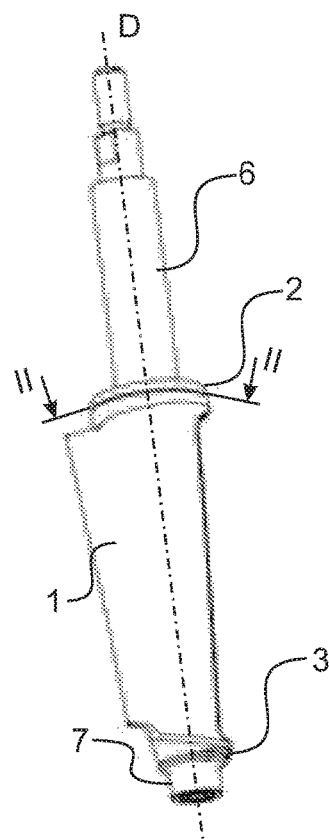

(51) Int. Cl.
*F04D 27/02* (2006.01)
*F16F 15/14* (2006.01)
*F16F 7/10* (2006.01)

(56) References Cited

U.S. PATENT DOCUMENTS

| | | | | |
|---|---|---|---|---|
| 2,862,686 A * | 12/1958 | Bartlett | ...................... | F01D 5/16 |
| | | | | 416/213 R |
| 4,355,957 A * | 10/1982 | Sifford | ...................... | F01D 5/26 |
| | | | | 416/145 |
| 4,441,859 A * | 4/1984 | Sadler | ...................... | F01D 5/16 |
| | | | | 416/145 |
| 5,219,144 A * | 6/1993 | Fox | .......................... | F16F 7/10 |
| | | | | 248/562 |
| 6,554,112 B2 * | 4/2003 | Kato | ........................ | F16F 7/10 |
| | | | | 188/378 |
| 6,827,551 B1 * | 12/2004 | Duffy | ....................... | F01D 5/16 |
| | | | | 415/119 |
| 8,038,387 B2 * | 10/2011 | Houradou | ............. | F01D 17/162 |
| | | | | 384/215 |
| 9,334,740 B2 * | 5/2016 | Kellerer | .................... | F01D 5/16 |
| 9,334,751 B2 * | 5/2016 | Dube | ....................... | F01D 5/10 |
| 9,982,559 B2 * | 5/2018 | Hartung | .................. | F01D 25/06 |
| 2013/0195651 A1 | 8/2013 | Dube et al. | | |
| 2013/0280083 A1 * | 10/2013 | Hartung | ................... | F01D 5/16 |
| | | | | 416/223 R |

FOREIGN PATENT DOCUMENTS

WO    2012095067 A1    7/2012
WO    2014007895 A2    1/2014

* cited by examiner

ADJUSTABLE GUIDE VANE FOR A TURBOMACHINE

The studies that have led to this invention were supported according to the Financial Aid Agreement No. CSJU-GAM-SAGE-2008-001 under the Seventh Framework Program of the European Union (FP7/2007-2013) for Clean Sky Joint Technology Initiative.

BACKGROUND OF THE INVENTION

The present invention relates to an adjustable guide vane for a turbomachine, a turbomachine with the guide vane, and a method for manufacturing the guide vane.

Known from US 2013/0195651 A1 is a damping arrangement for a variable guide vane with an outer bushing and an inner bushing that comprises an elastomeric material.

Known from WO 2012/095067 A1 is a turbomachine blade with a tuning element or an impact element, which does not reduce the resonances of the blade in an essentially non-dissipative manner through friction, but rather by impact contacts.

SUMMARY OF THE INVENTION

An object of an embodiment of the present invention is to improve a turbomachine.

This object is achieved by an adjustable guide vane for a turbomachine with the features of the present invention. Described below is a turbomachine with a guide vane as described here and a method for manufacturing a guide vane as described here. Advantageous embodiments of the invention are discussed in further detail below.

According to an embodiment of the present invention, an adjustable guide vane for a turbomachine, in particular at least one adjustable guide vane of a turbomachine, has a vane element for flow deflection and a turning disk with a first impact chamber, in which at least one, and in particular exactly one, impulse element is arranged with play of movement.

Surprisingly, it has been found that, by way of such an impact chamber with impulse elements, resonances of an adjustable guide vane can be reduced in an especially advantageous manner.

In one embodiment, the turbomachine is an axial turbomachine, in particular a compressor or a turbine of a gas turbine, in particular an aircraft engine gas turbine.

In one embodiment, the turning disk has a cylindrical outer contour. In one embodiment, it is rotatably accommodated in full or in part in a recess fixed on a turbomachine casing or is designed or provided for this purpose. In an enhancement, the adjustable guide vane is rotatably mounted around its axis of rotation by means of the turning disk on a bearing that is fixed on a turbomachine casing. Additionally or alternatively, the adjustable guide vane comprises a pivot or trunnion, which is rotatably mounted in a casing-fixed bearing of the turbomachine around the axis of rotation of the guide vane or is designed or provided for this purpose, wherein the turning disk can then be arranged radially between the trunnion and the vane element and, in particular, can transition into the trunnion and/or the vane element, and/or can be accommodated in the recess with play. In an enhancement, the trunnion has a smaller outer diameter than the turning disk.

In one embodiment, the turning disk is arranged radially outside or on a side of the vane element that faces away from an axis of rotation of the turbomachine. Such a radially outer arrangement of an impact chamber with impulse elements can be of advantage, in particular, in terms of bearing and/or vibration engineering. Equally, in one embodiment, the turning disk can be arranged radially inside or on a side of the vane element that faces the axis of rotation of the turbomachine. Such a radially inner arrangement of an impact chamber with impulse elements can be of advantage, in particular, for other vibrational modes. In one embodiment, the adjustable guide vane has both a radially outer turning disk and a radially inner turning disk, wherein the radially outer turning disk and/or the radially inner turning disk are or is designed in the way described here and, in particular, each has a first impact chamber, in which an impulse element is arranged with play of movement. A first impact chamber of a radially inner turning disk and a radially outer turning disk can be identical or different, in particular for different vibrational modes.

In one embodiment, the radially outer turning disk and/or the radially inner turning disk have or has one or a plurality of second impact chambers, which are in alignment with the first impact chamber in a first matrix direction and in each of which at least one, and in particular exactly one, impulse element is arranged with play of movement. In addition, the radially outer turning disk and/or the radially inner turning disk, respectively, have or has one or a plurality of third impact chambers, which are in alignment with the first impact chamber in a second matrix direction that differs from the first matrix direction and in each of which at least one, and in particular exactly one, impulse element is arranged with play of movement. In one embodiment, the first and second matrix directions enclose an angle of at least 3°, in particular at least 30°, and/or at most 15°, in particular at most 150°, with each other. In an enhancement, the first impact chamber, the second impact chamber, and the third impact chamber are arranged on an arc around the axis of rotation of the guide vane. The first matrix direction of the radially outer turning disk and the first matrix direction of the radially inner turning disk can be parallel to each other or can be at an angle or rotated with respect to each other. Additionally or alternatively, the second matrix direction of the radially outer turning disk and the second matrix direction of the radially inner turning disk can be parallel to each other or can be at an angle or rotated with respect to each other.

In an enhancement, the radially outer turning disk and/or the radially inner turning disk, respectively, have or has one or a plurality of fourth impact chambers, which are spaced apart from the first impact chamber in the first and second matrix directions, are in alignment, in particular, with a second impact chamber in the second matrix direction and/or with a third impact chamber in the first matrix direction, and/or are arranged in a plane with the first impact chamber and a second impact chamber and a third impact chamber, and in each of which at least one, and in particular exactly one, impulse element is arranged with play of movement. In an enhancement, the first impact chamber, the second impact chamber, the third impact chamber, and the fourth impact chamber are arranged on an arc around the axis of rotation of the guide vane in a preferably equidistant manner.

In one embodiment, the first impact chamber, one or a plurality, and in particular all, of the second impact chambers, one or a plurality, and in particular all, of the third impact chambers, and, if appropriate, one or a plurality, and in particular all, of the fourth impact chambers of a turning disk are arranged in a common plane. In particular, the first impact chamber and at least one second impact chamber and at least one third impact chamber and at least one fourth impact chamber can be distributed in a matrix-like manner, in particular equidistant from one another or in a checkerboard-like manner.

In one embodiment, at least one third impact chamber and the first impact chamber and/or at least one second impact chamber and/or at least one fourth impact chamber of the radially outer and/or radially inner turning disk are identical in design and, in particular, have the same dimensions and/or are manufactured from the same material. Additionally or alternatively, at least one third impact chamber and the first impact chamber and/or at least one second impact chamber and/or at least one fourth impact chamber of the radially outer and/or radially inner turning disk are different in design and, in particular, have different dimensions and/or are manufactured from different material. Additionally or alternatively, at least one impulse element arranged in a third impact chamber and the impulse element arranged in the first impact chamber and/or at least one impulse element arranged in a second impact chamber and/or at least one impulse element arranged in a fourth impact chamber of the radially outer and/or the radially inner turning disk are identical in design and, in particular, have the same dimensions and/or are manufactured from the same material. Additionally or alternatively, at least one impulse element arranged in a third impact chamber and the impulse element arranged in the first impact chamber and/or at least one impulse element arranged in a second impact chamber and/or at least one impulse element arranged in a fourth impact chamber of the radially outer and/or the radially inner turning disk are different in design and, in particular, have different dimensions and/or are manufactured from different material.

Surprisingly, it has been found that, by way of such an offset of at least three impact chambers with impulse elements in at least two directions, resonances of the vane can be reduced in an especially advantageous manner.

In one embodiment, one or a plurality of impact chambers of the radially outer and/or radially inner turning disk each have mutually opposite-lying walls in at least one first impact direction and one second impact direction, in which the respective impulse element has play of movement and which enclose with each other an angle of at least 30° and at most 150°, in particular an angle of between 85° and 95°, and/or respectively enclose with the axis of rotation of the adjustable guide vane an angle of at least 75° and at most 105°, in particular an angle of between 85° and 95°, wherein the distance between mutually opposite-lying walls in the first impact direction and the distance between the mutually opposite-lying walls in the second impact direction differ by at most 10%, in particular by at most 5%, and, in particular, are identical.

If, for example, one impact chamber has a square cross section perpendicular to the axis of rotation, then the distances in the two impact directions parallel to the side walls of the square cross section that enclose with each other and respectively with the axis of rotation an angle of 90° are identical. If, for example, one chamber has a circular cross section perpendicular to the axis of rotation, then the distances in all impact directions that enclose with the axis of rotation an angle of 90° are identical.

Surprisingly, it has been found that, by way of such at least essentially identical distances of mutually opposite-lying walls of impact chambers in at least two impact directions in which the respective impulse element has play of movement, resonances of the vane can be reduced in an especially advantageous manner, in particular insofar as these impact directions are, at least essentially, perpendicular to the axis of rotation. In one embodiment, the play of movement in at least one impact direction is at least 0.01 mm, in particular at least 0.1 mm, and/or at most 1.5 mm, in particular at most 1.2 mm.

In an enhancement, at least one wall of an impact chamber, in particular one of the aforementioned mutually opposite-lying walls, encloses with the axis of rotation of the vane an angle of at most 15°, in particular at most 5°. By way of such an at least essentially radial wall, resonances of the vane can be reduced in an especially advantageous manner.

In an enhancement, at least one wall of an impact chamber, in particular one of the aforementioned mutually opposite-lying walls and/or at least one wall that encloses with the axis of rotation of the vane an angle of at least 75° and/or at most 105°, is flat or planar. By way of such a wall, impact contacts can be induced in an especially advantageous manner.

In an enhancement, at least one of the impact chambers has a circular or polygonal, in particular a rectangular, pentagonal, or hexagonal, cross section. In one embodiment, one such impact chamber has a polygonal, in particular rectangular, pentagonal, or hexagonal, cross section that is perpendicular to this cross section. Thus, an impact chamber can be, in particular, circular-cylindrical in form, so that it has a circular cross section and, perpendicular thereto, a rectangular cross section.

In an enhancement, one or a plurality, and in particular all, of the impulse elements each have a weight of at least 0.01 g and/or at most 0.075 g. Additionally or alternatively, in one embodiment, a density of one or a plurality, and in particular all, of the impulse elements is at most 80%, in particular at most 70%, of the density of the vane element. Surprisingly, it has been found that, by way of this tuning of the densities of impulse elements and vane elements, the resonances thereof can be reduced in an especially advantageous manner.

In an enhancement, one or a plurality, and in particular all, of the impulse elements are spherical in shape. Additionally or alternatively, in one embodiment, one or a plurality, and in particular all, of the impulse elements contain or contains ceramics, in particular oxide ceramics, in particular zirconium dioxide ($ZrO_2$) and, in particular, is or are composed thereof.

In an enhancement, one or a plurality, and in particular all, of the impact chambers is or are or will be manufactured in the turning disk by material removal, in particular by erosion and/or electrochemical machining (ECM), in particular PECM (pulsed electrochemical machining) or PE(C)M (precise electrochemical machining), of the turning disk. It is possible in this way to produce internal geometries and/or surfaces of the impact chambers in an advantageous manner. Additionally or alternatively, one or a plurality, and in particular all, of the impact chambers is or are closed in a cohesively bonded manner after arrangement of the impulse element, in particular by welding, soldering, and/or adhesive bonding. It is possible, in this way, to manufacture closed impact chambers in an advantageous manner.

In another enhancement, one or a plurality, and in particular all, of the impact chambers of the radially outer turning disk and/or the radially inner turning disk is or are arranged in an impulse element casing, which is manufactured separately, in particular in a multipart manner, and is or will be joined with a base body of the turning disk in a detachable or permanent manner.

In an enhancement, the first impact chamber of the radially outer and/or radially inner turning disk are or is arranged in an outer annular portion that faces away from the axis of rotation of the guide vane, in particular a half that is closer to the outer edge, in particular in a third of the turning disk that is closer to the outer edge. In this way, resonances of the vane can be reduced in an especially advantageous manner.

BRIEF DESCRIPTION OF THE DRAWING FIGURES

Figure 2:
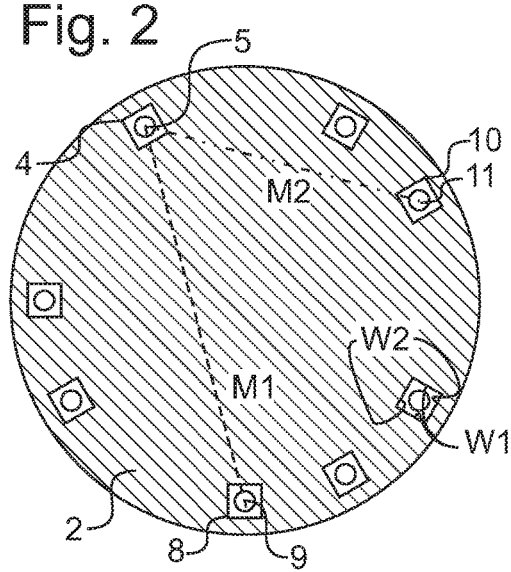

Further advantageous enhancements of the present invention ensue from the dependent claims and the following description of preferred exemplary embodiments. Shown for this purpose in partially schematic illustration is:

FIG. 1 an adjustable guide vane of a turbomachine according to an embodiment of the present invention in perspective view;

FIG. 2 a section along the line II-II in FIG. 1; and

Figure 3:
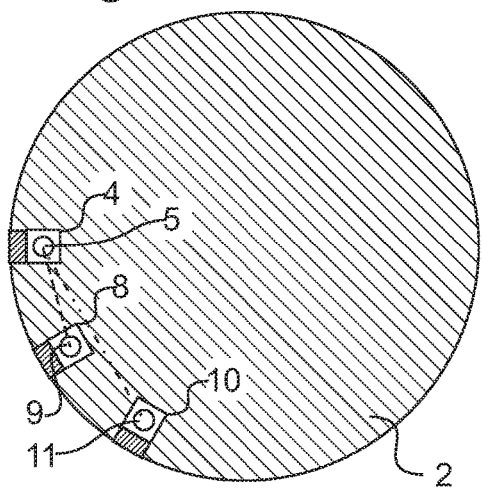

FIG. 3 a section, corresponding to FIG. 2, of an adjustable guide vane of a turbomachine according to another embodiment of the present invention.

DETAIL DESCRIPTION OF THE INVENTION

FIG. 1 shows an adjustable guide vane of a turbomachine according to an embodiment of the present invention in perspective view.

The adjustable guide vane has a vane element 1 for flow deflection, a radially outer turning disk 2, which is illustrated in FIG. 2 in a section perpendicular to an axis of rotation D of the adjustable guide vane, a radially outer trunnion 6, which is rotatably mounted around the axis of rotation D of the guide vane in a casing-fixed bearing of the turbomachine (not illustrated), a radially inner turning disk 3, and a radially inner trunnion 7, which is rotatably mounted around the axis of rotation D of the guide vane in a casing-fixed bearing of the turbomachine (not illustrated). In a modification, additionally or alternatively, FIGS. 2, 3 can also be sections perpendicular to the axis of rotation D through the radially inner turning disk 3.

As can be seen in the section of FIG. 2, the radially outer turning disk 2 (in the modification, additionally or alternatively, the radially inner turning disk 3) comprises a first impact chamber 4, in which an impulse element 5 is arranged with play of movement.

The radially outer turning disk 2 (in the modification, additionally or alternatively, the radially inner turning disk 3) has a second impact chamber 8, which is in alignment with the first impact chamber 4 in a first matrix direction M1, indicated by a dashed line in FIG. 2, and in which an impulse element 9 is arranged with play of movement. In addition, the radially outer turning disk 2 (in the modification, additionally or alternatively, the radially inner turning disk 3) has a third impact chamber 10, which is in alignment with the first impact chamber 4 in a matrix direction M2 that differs from the first matrix direction and is indicated in FIG. 2 by a double dash-dot line and in which an impulse element 11 is arranged with play of movement. The first matrix direction and the second matrix direction enclose an angle of about 60° with each other.

The radial outer turning disk 2 (in the modification, additionally or alternatively, the radially inner turning disk 3) has a plurality of fourth impact chambers, each of which is spaced apart differently from the first impact chamber 4 in the first and second matrix directions and in each of which an impulse element is arranged with play of movement. The first impact chamber 4, the second impact chamber 8, the third impact chamber 10, and the fourth impact chambers are arranged in a common plane on an arc around the axis of rotation of the guide vane.

In the exemplary embodiment, all of the impact chambers and the impulse elements arranged in them are each identical in design. In a modification that is not illustrated, impact chambers and/or impulse elements can also be different in design.

In the exemplary embodiment of FIGS. 1, 2, the impact chambers are cuboid, wherein the impact chambers have mutually opposite-lying walls in a first impact direction and a second impact direction parallel to side walls of the respective cross section of the impact chambers in FIG. 2, in which the respective impulse elements have play of movement and which enclose with each other and respectively with the axis of rotation D of the adjustable guide vane an angle of 90°, with a distance between the mutually opposite-lying walls in the first impact direction and a distance between the mutually opposite-lying walls in the second impact direction being the same. The play of movement in these impact directions is at least 0.01 mm and at most 1.5 mm. In FIG. 2, by way of example, the mutually opposite-lying walls of a fourth impact chamber in the first impact direction are labeled W1 and the mutually opposite-lying walls of this impact chamber in the second impact direction are labeled W2.

The flat walls W enclose with the axis of rotation D of the vane an angle of 0°.

In the exemplary embodiment, the spherical impulse elements are composed of $ZrO_2$ and each has a weight of between 0.01 g and 0.075 g, with their density being at most 80% of a density of the vane element 1.

The impact chambers are or will be manufactured by removal of material by erosion or electrochemical machining. Additionally, after arrangement of the respective impulse element, the impact chambers are or will be closed in a cohesively bonded manner by welding, soldering, or adhesive bonding.

As can be seen in the section of FIG. 2, the impact chambers of the radially outer turning disk 2 (in the modification, additionally or alternatively, of the radially inner turning disk 3) are arranged in an outer annular portion that faces away from the axis of rotation of the guide vane, in particular in a third of the turning disk that is closer to the outer edge.

FIG. 3 shows a section, corresponding to FIG. 2, through a radially outer (in a modification, additionally or alternatively, a radially inner) turning disk of an adjustable guide vane of a turbomachine according to another embodiment of the present invention. This further embodiment corresponds, with the exception of the differences explained below, to the embodiment explained above with reference to FIGS. 1, 2, so that features that correspond to one another are identified by identical reference symbols, reference is made to the above description, and only differences will be addressed below.

In the embodiment of FIG. 3, the radially outer turning disk 2 (in the modification, additionally or alternatively, the radially inner turning disk 3; compare FIG. 1) comprises only one first impact chamber 4 with an impulse element 5, one second impact chamber 8 with an impulse element 9, and one third impact chamber 10 with an impulse element 11, which are each of identical design.

In the embodiment of FIG. 3, the first matrix direction and the second matrix direction enclose an angle of about 15°.

Whereas the impact chambers of the embodiment in FIG. 2 are manufactured by removal of material from a radial front face of the turning disk with respect to the axis of rotation of the turbomachine and, after arrangement of the impulse element, are or will be closed by a cover, which is or will be welded, soldered, or adhesively bonded to the turning disk, the impact chambers 4, 8, and 10 in the embodiment of FIG. 3 are or will be manufactured by removal of material starting from an outer periphery or a cylindrical surface of the turning disk and, after arrangement of the impulse element 5, 9, or 11, closed by a cover, which is or will be welded, soldered, or adhesively bonded to the turning disk. In a section perpendicular to the section of FIG. 3, the impact chambers 4, 8, and 10 have a square or circular cross section.

Although, in the preceding description, exemplary embodiments were explained, it is noted that a large number of modifications are possible. Moreover, it is noted that the exemplary embodiments are merely examples, which in no way are intended to limit the protective scope, the applications, and the structure. Instead, the preceding description provides the person skilled in the art with a guideline for implementing at least one exemplary embodiment, wherein it is possible to make diverse modifications, in particular in regard to the function and arrangement of the described components, without departing from the protective scope, as ensues from the claims and combinations of features equivalent thereto.

What is claimed is:

1. An adjustable guide vane for a turbomachine, comprising
    a vane element and a turning disk, wherein the turning disk has a first impact chamber, in which an impulse element is arranged with play of movement,
    wherein the first impact chamber is arranged on an arc, in the turning disk, around the axis of rotation of the guide vane and turning disk, and
    wherein the impulse element is configured and arranged to dampen vibrations in the turning disk and the guide vane.

2. The adjustable guide vane according to claim 1, wherein the turning disk has at least one second impact chamber, which is in alignment with the first impact chamber in a first matrix direction and in which an impulse element is arranged with play of movement, and at least one third impact chamber, which is in alignment with the first impact chamber in a second matrix direction that is different from the first matrix direction and in which an impulse element is arranged with play of movement.

3. The adjustable guide vane according to claim 2, wherein the first impact chamber, the second impact chamber, and the third impact chamber are arranged on the arc around the axis of rotation of the guide vane.

4. The adjustable guide vane according to claim 1, wherein the first impact chamber has mutually opposite-lying walls in at least a first impact direction and a second impact direction, which enclose with each other an angle of at least 30° and at most 150° and/or, respectively, enclose with the axis of rotation of the guide vane an angle of at least 75° and at most 105°, with the distance between the mutually opposite-lying walls in the first impact direction and the distance between the mutually opposite-lying walls in the second impact direction differing by at most 10%.

5. The adjustable guide vane according to claim 4, wherein at least one of the walls encloses with the axis of rotation of the guide vane an angle of at most 15°.

6. The adjustable guide vane according to claim 4, wherein at least one of the walls is planar.

7. The adjustable guide vane according to claim 1, wherein the first impact chamber has at least a circular or polygonal, in particular rectangular, pentagonal, or hexagonal, cross section.

8. The adjustable guide vane according to claim 1, wherein the weight of the impulse element arranged in the first impact chamber is at least 0.01 g and at most 0.075 g.

9. The adjustable guide vane according to claim 1, wherein the density of the impulse element arranged in the first impact chamber is at most 80% of the density of the vane element.

10. The adjustable guide vane according to claim 1, wherein the impulse element arranged in the first impact chamber is spherical and/or comprises ceramics.

11. The adjustable guide vane according to claim 1, wherein the first impact chamber is manufactured by material removal by erosion and/or electrochemical machining and/or, after arrangement of the impulse element, is closed in a cohesively bonded manner by welding, soldering, and/or adhesive bonding.

12. The adjustable guide vane according to claim 1, wherein the first impact chamber is arranged in an outer annular portion of the turning disk.

13. The adjustable guide vane according to claim 1, wherein at least one adjustable guide vane is rotatably mounted around the axis of rotation of the guide vane on a bearing fixed to the turbomachine casing in a turbomachine.

14. The adjustable guide vane according to claim 13, wherein the turning disk is accommodated in a recess fixed on the turbomachine casing.

15. The adjustable guide vane according to claim 1, wherein the first impact chamber is manufactured by material removal by erosion and/or electrochemical machining, and/or, after arrangement in the impulse element, is closed in a cohesively bonded manner by welding, soldering, and/or adhesive bonding.

* * * * *